(12) United States Patent
Krainer

(10) Patent No.: US 6,465,985 B2
(45) Date of Patent: Oct. 15, 2002

(54) ARRANGEMENT INCLUDING MEANS FOR DISPLAYING A CHARGING STATE

(75) Inventor: Erich Krainer, St. Veit an der Glan (AT)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/942,489

(22) Filed: Aug. 30, 2001

(65) Prior Publication Data

US 2002/0047688 A1 Apr. 25, 2002

(30) Foreign Application Priority Data

Aug. 31, 2000 (EP) .............................. 00890266

(51) Int. Cl.$^7$ ............................................. H01M 10/46
(52) U.S. Cl. ....................................................... 320/114
(58) Field of Search ................................. 320/112, 113, 320/114, 115, 137, 163, 132

(56) References Cited

U.S. PATENT DOCUMENTS 3,327,198 A * 6/1967 Rauch
4,398,139 A * 8/1983 Prinsze
4,412,168 A * 10/1983 Sell
5,859,524 A * 1/1999 Ettes

FOREIGN PATENT DOCUMENTS

JP 01 318 512 A * 12/1989

OTHER PUBLICATIONS

E. Krainer, Mains–independent lady shaver, type No. HP2755–60 May 1994.
E. Krainer, Beard Trimmer, type No. HS080 Dec. 1995.

* cited by examiner

Primary Examiner—Edward H. Tso
(74) Attorney, Agent, or Firm—Ernestine C. Bartlett

(57) ABSTRACT

In an arrangement (1) which firstly includes charging current generation means (2), which have a first output terminal (9) and a second output terminal (10), and which secondly includes rechargeable energy storage means (2) connected to the second output terminal (10), which rechargeable energy storage means (2) can be recharged with the charging current (IL) and which thirdly includes load means (3) which can be connected to the second output terminal (10), which load means (3) can be supplied with power from the energy storage means (2), the load means (3) and the energy storage means (2) form a series combination (SC) between the first output terminals (9) and a second a second output terminal (10).

15 Claims, 1 Drawing Sheet

ARRANGEMENT INCLUDING MEANS FOR DISPLAYING A CHARGING STATE

Arrangement including means for displaying a charging state

BACKGROUND OF THE INVENTION

This invention relates to an arrangement which includes charging current generation means which have a first output terminal and a second output terminal and which are arranged to generate and supply a charging current at the second output terminal. The arrangement includes rechargeable energy storage means connected to the second output terminal for charging the storage means, which are rechargeable by the charging current. The arrangement also includes load means which can be connected to the second output terminal and can be supplied with power from the energy storage means.

Such an arrangement of the type as defined in the opening paragraph has been marketed by the applicants, for example, in the form of a mains-independent lady shaver having type no. HP2755/60 and a beard trimmer having type no. HS080, and is therefore known.

The known arrangement includes charging current generation means which, when the appliance is located in an activated charging station connected to a power supply network, is arranged for generating and supplying a charging current to energy storage means to recharge the energy storage means for mains-independent operation, while the arrangement is operating mains-independently outside the charging station. The charging current generation means have a first output terminal with a reference potential and a second output terminal, while the charging current can be delivered via the second output terminal to the energy storage means connected between the first output terminal and the second output terminal. In the charged state and in mains-independent operation, the energy storage means are provided for supplying power to load means. The arrangement further includes switching means for activating and deactivating the power supply to the load means, while the switching means and the load means forming a series combination between the first output terminal and the second output terminal, so that this series combination is connected in parallel to the energy storage means between the first output terminal and the second output terminal.

There is a problem with the known arrangement that when the load means are activated and, above all, when the energy storage means are completely discharged and, consequently, the charging current is delivered to the storage means, a large part of the charging current flows as a detrimental effect as a leakage current through the load means and thus leads to practically no recharging of the energy storage means at all, because the load means have a considerably lower resistance than the energy storage means. For a user of the arrangement this problem causes incomprehensibly and unacceptably long charging times for the charging of the energy storage means.

SUMMARY OF THE INVENTION

It is an object of the invention to resolve the problems defined above with an improved arrangement in accordance with the type defined in the opening paragraph.

The object defined in the previous paragraph is achieved with an arrangement of the type defined in the opening paragraph in that the load means and the energy storage means form a series combination between the first output terminal and the second output terminal.

Providing the characteristic features in accordance with the invention advantageously achieves that a leakage current is prevented from occurring in a current path constituted by the load means and running parallel to the energy storage means and that, therefore, when the charging current is applied to the energy storage means by the charging current generation means, the energy storage means are reliably recharged with the charging current.

Providing the characteristic features in accordance with claim 2 advantageously achieves that if the charging current is present for the first switching state of the first switching means, it is avoided that a charging current appears between the first output terminal and the second output terminal and that, if the charging current appears for the second switching state of the switching means, a charging voltage appears which is formed by a voltage drop of the load means and by a time-dependent variable voltage drop of the energy storage means.

Providing the characteristic features in accordance with claim 3 advantageously achieves that when the charging current is present, the charging voltage appearing between the first output terminal and the second output terminal is increased by a substantially constant forward voltage of the diode and that, as a result, a display means voltage can be generated, which is necessary for the charging state display means to operate. A further advantage is obtained in that even if the charging current generation means are supplied with an AC supply voltage, a direction of the charging current is unambiguously defined and that at least during a half wave of the AC supply voltage the display means voltage that is required can be generated.

In an arrangement according to the invention, the charging state display means may be realized, for example, via a incandescent lamp. However, it has proved to be advantageous to provide the characteristic features as defined in claim 4, because they provide energy-saving charge display means. A further advantage is obtained in that the characteristic features as defined in claim 4 provide that the necessary display means voltage can be supplied in an extremely precise manner and that —as soon as the necessary display means voltage is available —a brightness is obtained for a light radiated by the charge display means, which brightness is as constant as possible, even when the energy storage means are being charged, so that, as would be the case with an incandescent lamp, instead of showing the progress of the charging state by a variable brightness of the light radiated by the incandescent lamp, rather the actual charging of the energy storage means is shown. Furthermore, a suitable choice of a type of the light-emitting diode with a suitable forward voltage provides a display means voltage that is required, so that even for the case where the energy storage means are fully discharged, already a reliable indication of the charging of the energy storage means is obtained when the charging current appears and when the second switching state of the switching means is there.

Providing the characteristic features as defined in claim 5 advantageously achieves that even when an amplitude of the AC supply voltage exceeds a blocking voltage of the light-emitting diode, the display means for the charging state can be realized by the light-emitting diode.

The aspects defined above and further aspects of the invention become evident from the example of embodiment to be described hereinafter and will be explained with reference to these examples of embodiment.

BRIEF DESCRIPTION OF THE DRAWINGS

The invention will be further described with reference to two examples of embodiment shown in the drawings to which, however, the invention is not restricted.

DESCRIPTION OF THE PREFERRED EMBODIMENTS

Figure 1:
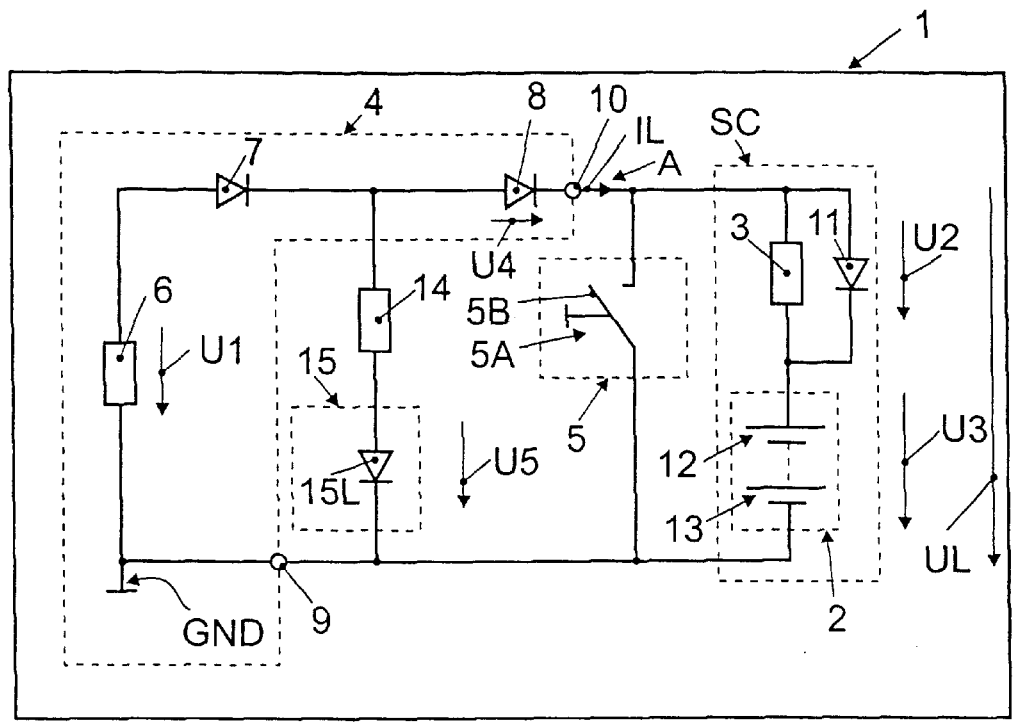
FIG. 1 diagrammatically shows in the form of a block diagram an arrangement in accordance with a first example of an embodiment of the invention.

FIG. 1 shows an arrangement 1 formed for mains-independent operation. The arrangement 1 includes energy storage means 2, load means 3, charging current generation means 4 and first switching means 5.

The charging current generation means 4 include supply means 6, a first diode 7 and a second diode 8. The charging current generation means 4 further have a first output terminal 9 and a second output terminal 10. The supply means 6 are realized here by an air core coil, so that a charging station, not shown in FIG. 1, can supply energy by means of an electromagnetic alternating field. When the alternating field is present at the supply means 6, a supply voltage U1 relative to a reference potential GND can be tapped from the supply means 6. The supply means 6 are connected, on the one hand, to the first output terminal 9 and, on the other hand, to the first diode 7. Between the first diode 7 and the second output terminal 10 is connected the second diode 8. The first diode 7 is arranged for half-wave rectification of the supply voltage U1. The second diode 8 is arranged for defining a direction of the charging current IL shown by arrow A and a substantially constant first forward voltage U4 can be tapped when the charging current IL is present on the second diode 8. As regards their forward direction the first diode 7 and the second diode 8 are arranged so that a charging current IL, which can be generated via the supply voltage U1, can be fed to the second output terminal 10 in the direction of the arrow A by the charging current generation means 4. The charging current generation means 4 are accordingly arranged for generating and delivering a charging current when the supply voltage U1 is present on the second output terminal 10.

The load means 3 are in the present case formed by an electromotor. Since an electromotor usually has ohmic components and inductive components, it is necessary for a freewheeling diode 11 to be connected in parallel to the load means 3. However, also different load means 3 may be provided, due to which the freewheeling diode 11 may be omitted.

The energy storage means 2 are in the present case formed by a first energy storage cell 12 and a second energy storage cell 13. The energy storage means 2 are arranged so that they can be recharged with the charging current IL. When the energy storage means 2 have been charged, their voltage drop U3 can be taken from them. The energy storage means 2 are directly connected to the first output terminal 9 and via the load means 3 to the second output terminal 10. The load means 3 and the energy storage means accordingly form a series combination SC between the first output terminal 9 and the second output terminal 10. It may be stated that the energy storage means 2, however, may also be formed by a single energy storage cell, that is to say, for example, by the first energy storage cell 12 or by more than two energy storage cells. The energy storage means 2 may be realized, for example, by capacitors or NiMH accumulators or Li-Ion accumulators or Li-Polymer accumulators or — as in the present case — by NiCd accumulators.

The first switching means 5 are connected, on the one hand, to the first output terminal 9 and, on the other hand, to the second output terminal 10. Accordingly, the first switching means 5 are connected in parallel to the series combination SC. The first switching means 5 can be turned to a first switching state for activating the power supply to the load means 3 from the energy storage means 2. The first switching means 5 can further be turned to a second switching state to deactivate the power supply to the load means 3 from the energy storage means 2. The first switching means S are in the present case formed by a switch 5A which has a single make contact 5B, while the make contact SB can adopt a closed or open state. Accordingly, the switching means 5 are in the first switching state when the make contact 5B is closed and the second switching state when the make contact 5B is open. When the first switching state occurs, the load means 3 and the energy storage means 2 form a parallel combination, while the first output terminal 9 is short-circuited by the second output terminal 10. The load means 3 can be supplied with power from the energy storage means 2 when the parallel combination is formed. The freewheeling diode 11 is polarized in inverse direction in the first switching state of the switching means S. Accordingly, there is a voltage drop U3 of the energy storage means at the load means 3.

The arrangement 1 further includes a first dropping resistor 14, which is connected between the first diode 7 and the second diode 8. Between the first output terminal 9 and the first dropping resistor 14 are connected charging state display means 15 which are formed here by a light-emitting diode 1 5L. Accordingly, the charging state display means 15 are connected upstream of the second diode 8 and connected to the reference potential GND. To show the charging of the energy storage means 2, the charging state display means 15 need to have a minimum display voltage U5 which is defined in the present case by a forward voltage of the light-emitting diode 1SL. The first dropping resistor 14 has a current-limiting effect on the light-emitting diode 15 when there is a forward voltage.

In the following is explained the way of operation of the arrangement 1 with reference to an example of embodiment for the arrangement 1 shown in FIG. 1. According to this example of embodiment it is assumed that the arrangement 1 is operated in a mainsindependent manner. The arrangement 1 is in the present case formed by a shaver that can be operated without the mains, so that shaving means provided in the arrangement 1, but not shown, can be driven by load means 3 formed by a motor.

When the arrangement 1 is operated in a mains-independent manner, it is further assumed that the energy storage means 2 are first recharged and after that the voltage drop U3 of the energy storage means can be taken from the energy storage means 2. Furthermore it is assumed that the switching means 5 is operated to the first switching state, so that the load means 3 together with the energy storage means 2 form the parallel combination and the load means 3 is supplied with power from the energy storage means 2. When the arrangement 1 is continuously operated independently of the mains, and after a continuous supply of power to the load means 3 from the energy storage means 2, the voltage drop U3 of the energy storage means continuously decreases until, finally, the driving of the shaving means with the aid of the load means 3 formed by a motor is no longer possible. A user of the arrangement 1 puts the arrangement into a charger station for the arrangement 1. When a charger station is activated, energy is transferred by the supply means from the charger station to the arrangement 1, so that the supply voltage U1 relative to the reference potential GND can be tapped from the supply means 6. The supply voltage U1 is in the present case formed by an AC voltage having a 50 kHz frequency. By means of the first diode 7 a half-wave rectification of the supply voltage U1 takes place, so that every second half wave, in the concrete case every positive half wave of the supply voltage U1, is fed to the second diode 8. The second diode 8 delivers a charging current IL to the second output terminal 10 in the direction of the arrow A. Since the first switching means 5, as before, has been turned to the first switching state, the charging current IL flows through the first switching means 5 and the first output terminal 9 back to the power supply means 6. The first forward voltage U4 appearing at the second diode 8, however, is smaller than the display voltage U5 that is needed. In consequence, the light-emitting diode 15L forming the charging state display means 15 does not emit any light and, therefore, the charging state display means 15 do not display the charging of the energy storage means 2 either. The user notices a failure to display the charging of the energy storage means 2 and the switching state of the first switching means 5 is determined to be the cause of it. Subsequently, the first switching means 5 is operated to the second switching state by the user. When the second switching state occurs, the charging current IL supplied by the charging current generation means 4 on the second output terminal 10 flows via the series combination SC of the load means 3 and the energy storage means 2 back to the supply means 6. Accordingly, the parallel switching of the first switching means 5 to the series combination SC reliably and advantageously achieves that either the whole charging current Il flows through the load means 3 into the energy storage means 2, or the whole charging current IL flows from the second output terminal 10 through the first switching means 5 to the first output terminal 9 back to the supply means 6.

Even in the case where the energy storage means 2 are fully discharged, as a result of which no or only a very small voltage drop U3 can be taken from the energy storage means 2 in the first seconds and, as appropriate, even minutes of the charging of the energy storage means 2, there is already a load means voltage drop U2 at the load means 3. Thus, at the beginning of a charging of the energy storage means 2, only the load means voltage drop U2 forms a charging voltage UL that can be tapped between the first output terminal 9 and the second output terminal 10. The voltage drop U2 of the load means 3, however, is limited by a forward voltage of the freewheeling diode 11. Nevertheless, with the aid of the first forward voltage U4 of the second diode 8, together with the voltage drop U2 of the load means, already the necessary display means voltage US is reached. This offers the advantage that — even with fully discharged energy storage means 2 — immediately a reliable display of the charging of the energy storage means 2 by the charging state display means 15 is ensured. As soon as the necessary display means voltage U5 has been reached, the first dropping resistor 14 forms a current limitation for the charging state display means 15 to protect it against destruction.

Only during the charging is the charging voltage UL formed from the voltage drop U2 of the load means and the voltage drop U3 of the energy storage means as a function of time. After a charging period customary for the energy storage means 2 has elapsed, the arrangement 1 can again be taken from the charging station by the user and be used for the mains-independent operation.

Figure 2:
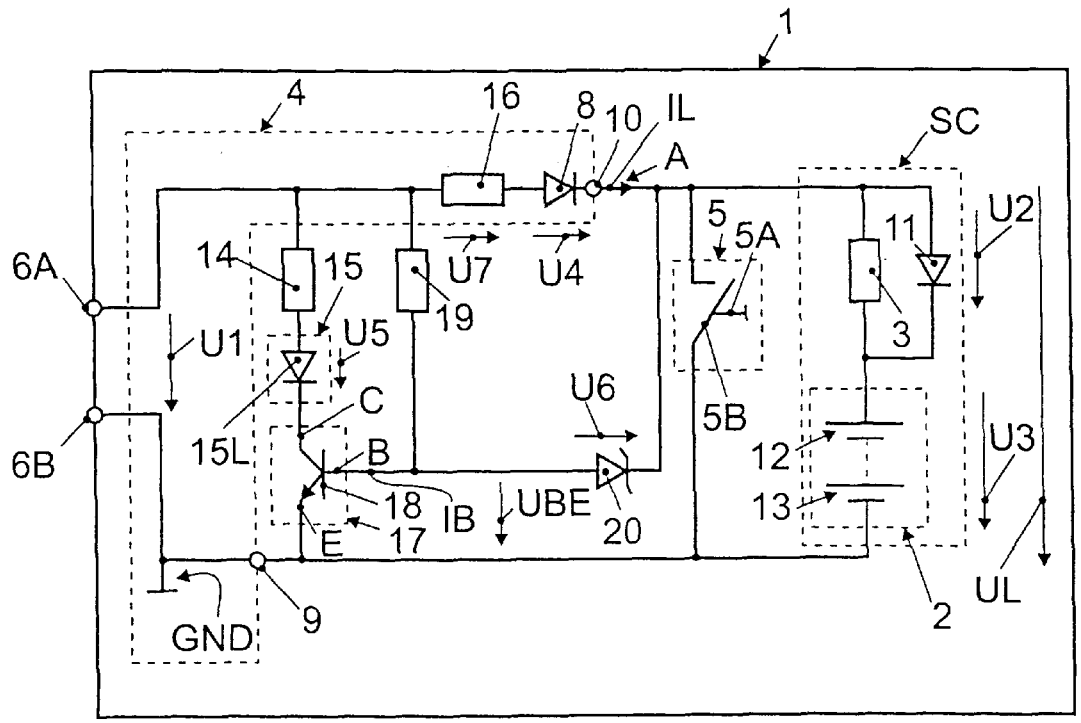
FIG. 2 shows in similar manner to FIG. 1 an arrangement in accordance with a second example of embodiment of the invention.

In the arrangement 1 shown in FIG. 2, in contrast with the arrangement 1 shown in FIG. 1, a first supply terminal 6A and a second supply terminal 6B are provided in lieu of the supply means 6, so that the arrangement 1 can be directly supplied with the supply voltage U1. In the charging current generation means 4 the first diode 7 shown in FIG. I is omitted.

The charging current generation means 4 include a second dropping resistor 16between the first supply terminal 6A and the second diode 8. When the charging current IL occurs, a voltage drop U7 of the dropping resistor can be tapped from the second dropping resistor 16.

The charging state display means 15 are in the present case connected upstream of the second diode 8 and the second dropping resistor 16. The arrangement 1 further includes second switching means 17 which are formed by a transistor 18, an NPN transistor 18 that is, and which are connected between the charging state display means 15 and the first output terminal 9. The transistor 18 has an emitter E which is connected to the first output terminal 9. The transistor 18 has a collector C which is connected to the charging state display means 15. The transistor 18 has a base B which is connected via a third dropping resistor 19 upstream of the second dropping resistor 16 and the second diode 8. Via the base B the transistor 18 can be controlled to its conducting state when its required base emitter voltage UBE is present by means of a base current IB flowing through the third dropping resistor 19. When the base emitter voltage UBE is too low, the transistor 18 is turned off. Accordingly, the charging state display means 15 can be connected to the reference potential GND via the second switching means 17.

The arrangement 1 further includes a third diode 20 which is connected between the base B of the transistor 18 and the second output terminal 10 in a way that the cathode of the third diode 20 is connected to the second output terminal 10 and the anode of the third diode 20 is connected to the base B of the transistor 18. The third diode 20 is actually a Schottky diode, so that, when the third diode 20 is driven in forward direction, a second forward voltage U6 can be tapped from the third diode 20, which forward voltage U6 adopts a smaller value than the base emitter voltage UBE required.

In the following will be explained the mode of operation of the arrangement 1 with reference to an example of embodiment for the arrangement shown in FIG. 2. According to this example of embodiment it is assumed that the energy storage means 2 of the arrangement 1 were discharged during the mains-independent operation of the arrangement 1. Furthermore, it is assumed that the first switching means 5 are turned to their first switching state and that a user inserts the arrangement 1 into a charging station for the arrangement 1. In the charging station the first supply terminal 6A and the second supply terminal 6B are brought into contact with a respective charging station terminal, so that the charging current generation means 4 is supplied with the supply voltage U1. The supply voltage U1 is in the present case a DC voltage. The supply voltage U1 produces with the aid of the second dropping resistor 16 and the second diode 8 a charging current IL that flows in the direction of the arrow A, from the second output terminal 10 via the first switching means 5 to the first output terminal 9. Depending on the first switching state of the first switching means 5, the cathode of the third diode 20 is connected to the reference potential GND. Via the third dropping resistor 19 the third diode 20 is connected to the first supply terminal 6A and, therefore, poled in forward direction, so that the second forward voltage U6 can be tapped from this third diode. The base of the transistor 18 is also connected to the first supply terminal 6A via the third dropping resistor 19, so that also the base emitter diode of the transistor 18 is poled in forward direction. However, since the second forward voltage U6 of the third diode 20 is smaller than the necessary base emitter voltage UBE, the transistor 18 or the second switching means 17, respectively, are driven to the blocking state and the lightemitting diode 15L therefore does not emit any light. The user notices that the display of the charging of the energy storage means 2 is lacking and, as a result of this noticing, the first switching means 5 are brought to their second switching state. In this second switching state the whole charging current IL now flows via the load means 3 or the freewheeling diode 11, respectively, into the energy storage means 2, so that already after a very brief period of time a voltage drop U3 of the energy storage means, which changes with time due to the charging, can be tapped from the energy storage means 2.

For the case of completely discharged energy storage means 2, however, first only the voltage drop U2 of the load means can be tapped between the first output terminal 9 and the second output terminal 10. The first forward voltage U4 and the voltage drop U7 of the dropping resistor is to be added to the voltage drop U2 of the load means to obtain the value of the supply voltage U1. In the case of the second switching state of the first switching means 5, there is no longer a voltage-limiting effect of the third diode 20 relative to the base emitter diode of the transistor 18, so that when the third dropping resistor 19 and the second dropping resistor 16 are suitably dimensioned, or when the light-emitting diode 1 SL is suitably selected relative to the display means voltage U5, even with fully discharged energy storage means 2, a reliable and prompt display of the charging of the energy storage means 2 will follow.

In the following the functioning of the arrangement 1 is explained with reference to a further example of embodiment for the arrangement 1 shown in FIG. 2. According to this example of embodiment it is assumed that the supply voltage U1 is formed with the aid of an AC voltage. According to this example of embodiment the second diode 8 additionally works as a half-wave rectifier. The second switching means 17 or the transistor 18, respectively, work as an overvoltage protection for the charging mode display means 15 when a negative half wave of the supply voltage U1 occurs. For a positive half wave of the supply voltage U1, the mode of operation of the arrangement 1 has already been fully described with reference to the example of embodiment explained above.

It may be observed that the structure of the energy storage means 2 may be gathered from the arrangement 1.

It may be observed that the energy storage means 2 and the load means 3 can be interchanged with their parallel-connected freewheeling diode 11, if necessary, and in this exchanged state also form a series combination SC.

What is claimed is:

1. An arrangement comprising:
    charging current generation means having a first output terminal and a second output terminal and arranged for generating and supplying a charging current (IL) to the second output terminal, a rechargeable energy storage means connected to the second output terminal for charging the storage means which are rechargeable with the charging current (IL), and
    load means which can be connected to the second output terminal and can be supplied with power from the energy storage means,
    characterized in that the load means and the energy storage means form a series combination (SC) between the first output terminal and the second output terminal.

2. An arrangement as claimed in claim 1, further comprising first switching means which, in a first switching state, may be arranged for activating and, in a second switching state, for deactivating the power supply to the load means from the energy storage means, and in that the first switching means are connected in parallel to the series combination (SC) between the first output terminal (9) and the second output terminal.

3. An arrangement as claimed in claim 2, characterized in that the charging current generation means comprise a diode connected to the second output terminal, and further comprising charging state display means which are connected upstream of the diode and can be connected to a reference potential.

4. An arrangement as claimed in claim 3, characterized in that the charging state display means comprise a light-emitting diode.

5. An arrangement as claimed in claim 4, further comprising second switching means which are arranged for switching the charging state display means on and off in dependence on the two switching states of the first switching means, and wherein the second switching means comprise a transistor.

6. An arrangement as claimed in claim 2 further comprising charging state display means coupled to an input supply terminal of the arrangement, and
    second switching means coupled to the charging state display means for switching the charging state display means on and off dependent upon the switching state of the first switching means.

7. An arrangement as claimed in claim 6 wherein the second switching means switch the charging state display means off when the first switching means is in its first switching state and switch the charging state display means on when the first switching means is in its second switching state.

8. A power supply for supplying a charge current to an energy storage means, the power supply comprising:
    first and second input supply voltage terminals,
    first and second output terminals,
    means for coupling the first and second output terminals to the first and second input supply voltage terminals,
    means connecting a load and the energy storage means in a series circuit to the first and second output terminals, and
    first switching means coupled in parallel with said series circuit to said first and second output terminals, wherein in the closed (on) state of the first switching means the energy storage means supplies energy to the load via the closed first switching means and in the open (off) state of the first switching means the energy storage means supplies no energy to the load means, but the energy storage means then receives energy to recharge it from a voltage at the first and second output terminals and via the series connected load.

9. The power supply as claimed in claim 8 wherein the first and second input supply voltage terminals receive an AC voltage, and
    said coupling means comprises first and second diodes connected in series between the first input supply voltage termianl and the first output terminal.

10. The power supply as claimed in claim 9 further comprising:
    a charging state display means coupled to a circuit point between the first and second diodes and to the second input supply voltage terminal.

11. The power supply as claimed in claim 8 wherein the first and second input supply voltage terminals receive a DC voltage, and said coupling means comprise a diode connected between the first and input supply voltage terminal and the first output terminal.

12. The power supply as claimed in claim 11 further comprising:

a charging state display means coupled to a circuit point between the first input supply voltage terminal and the diode, and a transistor switch coupling the charging state display means to the second input supply voltage terminal.

13. The power supply as claimed in claim 8 wherein;

said coupling means includes a diode coupled between the first input supply voltage terminal and the first output terminal, and the power supply further comprises;

a second series circuit including a charging state display means and a second switching means coupled to a circuit point between the first input supply voltage terminal and the diode and to the second input supplyl voltage terminal, wherein the second switching means switches the charging state display means on and off dependent upon the switching state of the first switch means.

14. The power supply as claimed in claim 13 wherein the switching state of the second switching means is in part determined by a voltage developed across the diode and/or a voltage developed across the load.

15. The power supply as claimed in claim 13 wherein the second switching means comprises a transistor having a control electrode coupled to the first output terminal via a further diode.

* * * * *